(12) United States Patent
Seo

(10) Patent No.: US 12,430,382 B2
(45) Date of Patent: Sep. 30, 2025

(54) AUDIOBOOK PLATFORM

(71) Applicant: Jonghee Seo, New York, NY (US)

(72) Inventor: Jonghee Seo, New York, NY (US)

( * ) Notice: Subject to any disclaimer, the term of this patent is extended or adjusted under 35 U.S.C. 154(b) by 73 days.

(21) Appl. No.: 18/241,642

(22) Filed: Sep. 1, 2023

(65) Prior Publication Data

US 2025/0077573 A1   Mar. 6, 2025

(51) Int. Cl.
| | |
|---|---|
| G06F 16/63 | (2019.01) |
| G06F 3/0482 | (2013.01) |
| G06F 3/0483 | (2013.01) |
| G06F 3/16 | (2006.01) |
| G06F 16/638 | (2019.01) |
| G06F 40/279 | (2020.01) |
| G06Q 10/101 | (2023.01) |
| G10L 13/02 | (2013.01) |

(52) U.S. Cl.
CPC ............ *G06F 16/63* (2019.01); *G06F 3/0482* (2013.01); *G06F 3/0483* (2013.01); *G06F 3/165* (2013.01); *G06F 16/638* (2019.01); *G06F 40/279* (2020.01); *G06Q 10/101* (2013.01); *G10L 13/02* (2013.01)

(58) Field of Classification Search
CPC ........ G06F 16/63; G06F 3/0482; G06F 3/165; G06F 16/638; G06F 16/60; G06F 2009/45579; G06F 2009/45595; G06F 9/45558; G06F 40/169; G06F 40/242; G06F 40/247; G06F 40/47; G06F 8/33; G06F 40/166; G06F 40/279; G10L 13/02; H04N 21/8106; H04N 21/43072; H04N 21/235; G06N 20/00; G06Q 10/101

See application file for complete search history.

(56) References Cited

U.S. PATENT DOCUMENTS

| | | | |
|---|---|---|---|
| 9,083,600 B1* | 7/2015 | Smith | H04W 4/21 |
| 2012/0206472 A1* | 8/2012 | Kandekar | G06F 40/103 |
| | | | 345/581 |
| 2016/0266740 A1* | 9/2016 | Glasgow | G06F 16/71 |
| 2018/0061274 A1* | 3/2018 | Frahling | G06F 40/247 |
| 2023/0116149 A1* | 4/2023 | Radhakrishna | G06F 8/33 |
| | | | 717/110 |
| 2024/0232543 A1* | 7/2024 | Horger | H04L 51/02 |

* cited by examiner

*Primary Examiner* — Marcin R Filipczyk
(74) *Attorney, Agent, or Firm* — Heedong Chae; Lucem, PC

(57) ABSTRACT

A system for the audiobook platform includes a server, a user application installed on a user device, and a contents provider device. The server includes a contents database, audiobook database, sound effects database, and music database. The server is connected to the user application and a plurality of the contents provider devices for data transmission. The system includes an audiobook request module which allows a user to request to other users for an audiobook. The system further includes an audiobook creation module to assist a user or users in collaboration in creating an audiobook. The system further provides sound effects or music in creating an audiobook. In addition, the system includes a reward calculation module and a copyright clearance module.

10 Claims, 4 Drawing Sheets

AUDIOBOOK PLATFORM

FIELD OF THE INVENTION

The present invention relates to an audiobook platform, specifically designed to maintain an extensive audiobook database while also featuring an audiobook request module that allows users to request a specific audiobook. Additionally, the audiobook platform includes an audiobook creation module, empowering users to create their own audiobooks to be shared with others. The platform is networked with multiple content provider devices to expand the range and diversity of available literary content.

BACKGROUND OF THE INVENTION

An audiobook is a recorded version of a book or other written material, typically narrated by a human voice. Audiobooks are usually narrated by professional voice actors or sometimes even the authors themselves. They may include sound effects and music to enhance the listening experience. Audiobooks provide an alternative way to "read" a book, allowing people to listen to the content rather than reading the text on a page or screen. This format is particularly useful for those who want to enjoy books while engaging in activities that make traditional reading impractical, such as driving, exercising, or doing household chores.

Audiobooks can be purchased in various formats, including CDs, digital downloads, and online streaming. They are available on various platforms, like Audible™, Google Play Books™, and Apple Books™, among others. Some public libraries also offer free audiobook rentals in both physical formats and as digital downloads.

Due to their convenience and the growth of digital media, audiobooks have gained significant popularity. They are particularly beneficial for individuals with visual impairments or conditions that make reading challenging.

In an educational context, audiobooks offer several benefits. For one, they can be invaluable for those learning a new language; listening to the spoken word can improve pronunciation and understanding of language rhythm and nuance. They can also be a helpful tool for students with reading difficulties or learning disabilities like dyslexia, offering an alternative method to engage with academic material. Furthermore, they allow educators to provide a multi-sensory learning experience, catering to auditory learners who absorb information more effectively through listening.

However, traditional audiobook platforms often fall short in key ways. First, they usually have limited collections, making it hard for users to find the specific books they want. This can be frustrating and time-consuming. Second, these platforms typically don't allow users to request books that aren't already available, leaving customer needs unmet.

To address these issues, the present invention provides an audiobook platform designed to foster a community where users can request specific audiobooks and create their own. This platform is also networked with various content providers. The primary aim of this invention is to solve these existing challenges and meet the long-standing needs of audiobook consumers and creators.

SUMMARY OF THE INVENTION

The present invention contrives to solve the disadvantages of the prior art. The present invention provides an audiobook platform with enhanced features. The audiobook platform includes an audiobook request module, allowing users to request specific audiobooks, and an audiobook creation module to facilitate the crafting of audiobooks. Additionally, the platform is connected to multiple content providers to ensure a broader acquisition of literary material.

The object of the invention is to provide a system for the audiobook platform which includes a server, a user application installed on a user device, and a contents provider device. The server includes a contents database and an audiobook database where the contents database stores literary works and the audiobook database stores audio files corresponding to the literary works. The server is connected to the user application and a plurality of the contents provider devices for data transmission. The system includes an audiobook request module which allow a user to request to other users for an audiobook. The system further includes an audiobook creation module to assist a user or users in collaboration in creating an audiobook. The system further provides sound effects or music in creating an audiobook. In addition, the system includes a reward calculation module and a copyright clearance module.

Another object of the invention is to provide an audiobook platform which includes a server, a user application installed on a user device, and an audiobook creation module. The server includes a contents database, audiobook database, sound effects database, and music database. The contents database stores literary works and the audiobook database stores audio files corresponding to the literary works. The sound effects database and music database respectively include a number of sound effects and music to be used in creating an audiobook.

The audiobook creation module is configured to assist the user to create an audio file for the certain literary work. The user can initiate recording of an audio file and then save it and resume recording any time. The audiobook creation module is configured to provide audio mapping to store locations of the audio file which are associated with corresponding locations of the certain literary work. Using this mapping, reading progress may be displayed on the screen on the user device while listening to an audiobook. Moreover, the audiobook creation module includes a suggestion module which analyzes the certain literary work and provides suggested sound effects and music to the user.

The advantages of the present invention are: (1) the audiobook platform of the present invention allows users to request specific audiobooks through its audiobook request module; (2) the audiobook platform of the present invention enables users to be both consumers and creators, enriching the user experience; (3) the audiobook platform of the present invention allows users to upload content; (4) the audiobook creation module of the present invention enables users to create an audiobook; (5) the audiobook creation module of the present invention allows multiple users to collaborate in real-time or asynchronously to create an audiobook; (6) the audiobook platform is connected to multiple content providers, facilitating a broader acquisition of literary content; (7) the reward system incentivizes content creation by providing rewards based on the number of plays; (8) the audiobook platform of the present invention can automatically suggest sound effects and music, making the audiobook creation process more engaging and professional; (9) the audiobook platform can verify uploaded content against existing literary works to prevent copyright infringement; and (10) the text-to-speech conversion module automatically converts literary works into spoken words for playback, and the translation module translates literary works into different languages.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
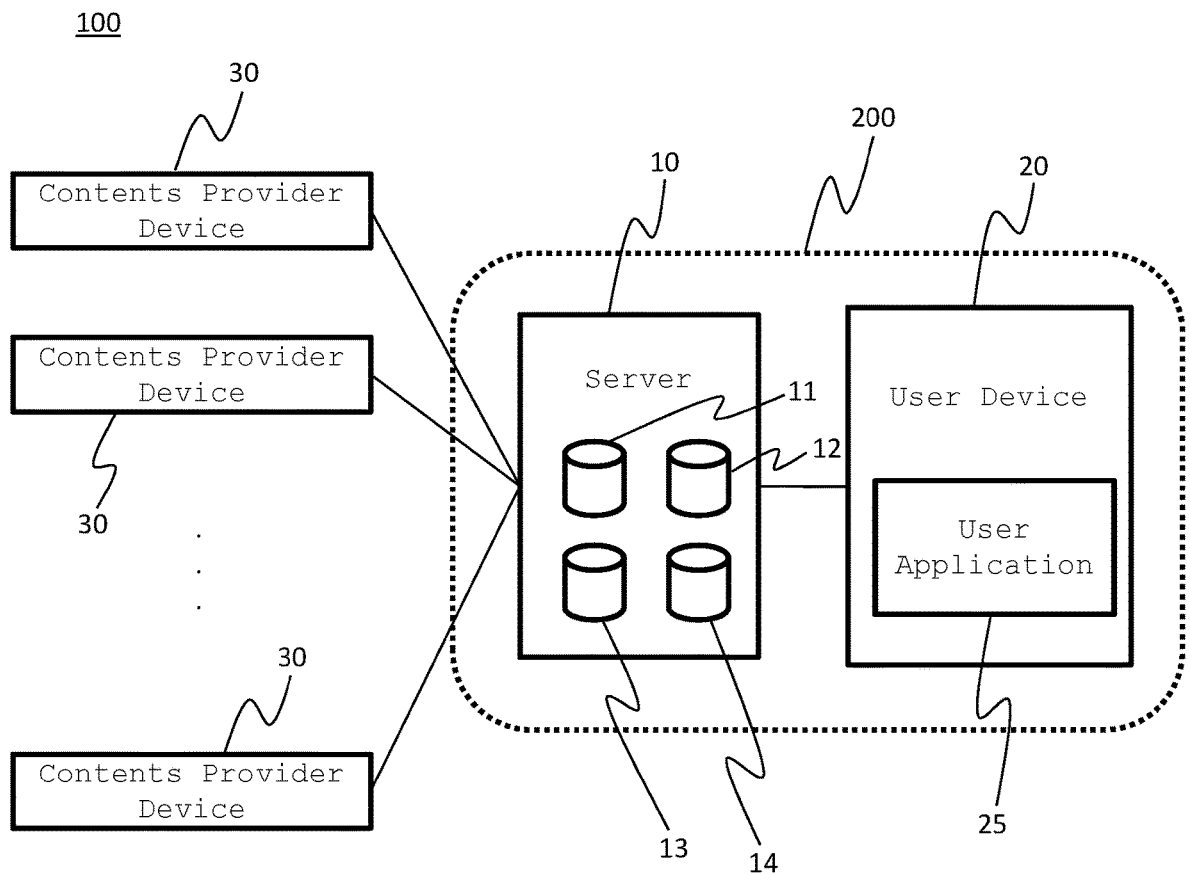
FIG. 1 shows a system for an audiobook platform according to one embodiment of the present invention.
Figure 2:
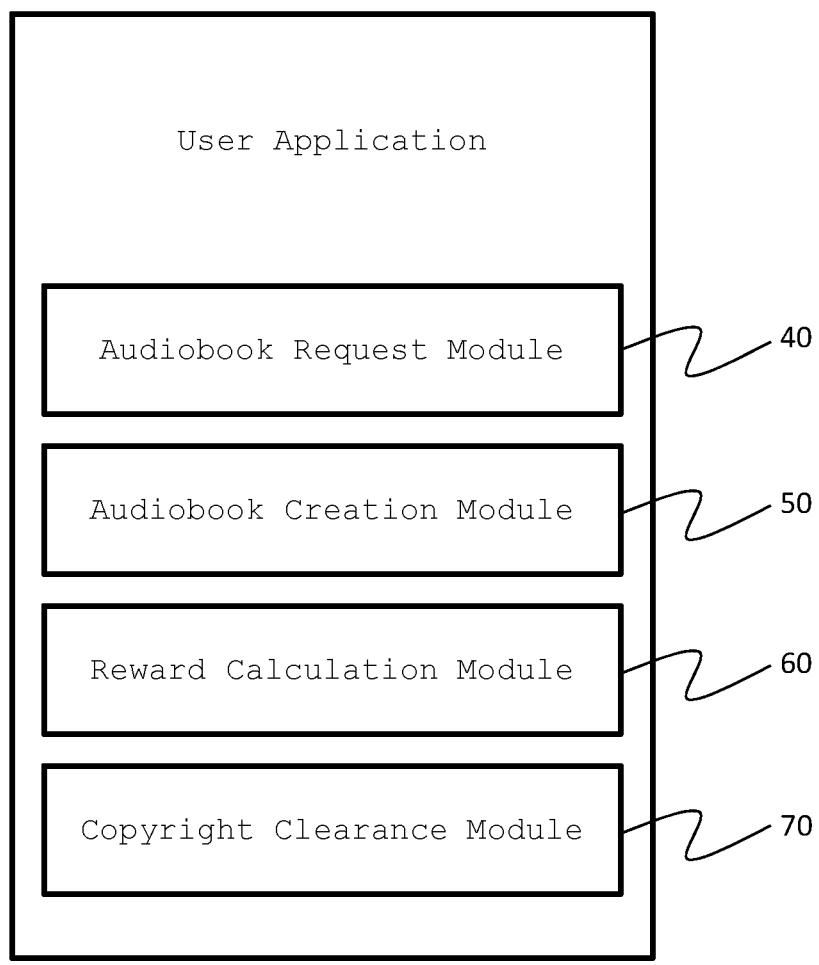
FIG. 2 shows a user application having various modules according to one embodiment of the present invention.
Figure 3:
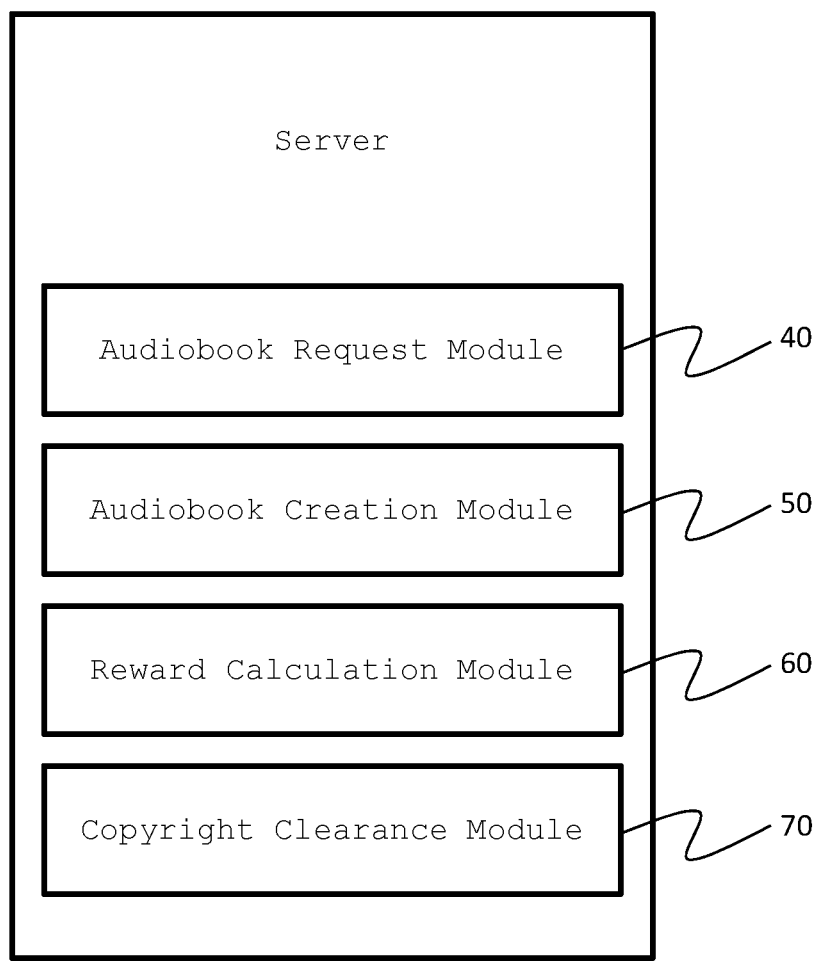
FIG. 3 shows a server having various modules according to another embodiment of the present invention.

FIG. 1 shows a system 100 for an audiobook platform 200 according to one embodiment of the present invention. FIG. 2 shows a user application 25 having various modules whereas FIG. 3 shows a server having such modules.

As shown in FIG. 1, the system 100 for the audiobook platform 200 includes a server 10, a user application 25 installed on a user device 20, and a contents provider device 30. The server 10 includes a contents database 11 and an audiobook database 12 where the contents database 11 stores literary works and the audiobook database 12 stores audio files corresponding to the literary works. Some literary works may or may not have corresponding audiobooks in the databases 11, 12. The user application 25 is installed on a user device 20 which has at least a display, and speaker, and additionally microphone. The server 10 is connected to the user application 25 for data transmission, and the server 10 is also connected to a plurality of the contents provider devices 30 for data transmission, Here, the devices 20, 30 may be a cell phone, smart phone, tablet computing device, desk top computer, MP3 player, etc.

The user application 25 is configured to allow a user to search a certain literary work and its corresponding audio file to play on the user device 20. If the corresponding audio file is stored in the audiobook database 12, the user application 25 is configured to play the corresponding audio file on the user device 20 upon the user's selection, whereas if there are plural corresponding audio files stored in the audiobook database 12, the user application 25 is configured to display the plural corresponding audio files and upon the user's selection, play the selected corresponding audio file.

If the certain literary work is not stored in the contents database 11, the server 10 is configured to send an inquiry to the contents provider device 30 to inquire whether a contents provider associated with the contents provider device 30 has the certain literary work. Furthermore, if the certain literary work is not stored in the contents database 11 and the contents provider associated with the contents provider device 30 has the certain literary work, the system 100 is configured to enable the contents provider device 30 to transmit the certain literary work to the server 10 for being stored in the contents database 11 upon the contents provider's election to do so.

If no corresponding audio file is stored in the audiobook database 12, the server 10 is configured to post an invitation to the users to create and upload a corresponding audio file. Together with the invitation or alternatively, the system 100 may allow the user to request an audiobook for the certain literary work using an audiobook request module. The audiobook request module may send a notification to the user if a requested audiobook is uploaded.

Figure 4:
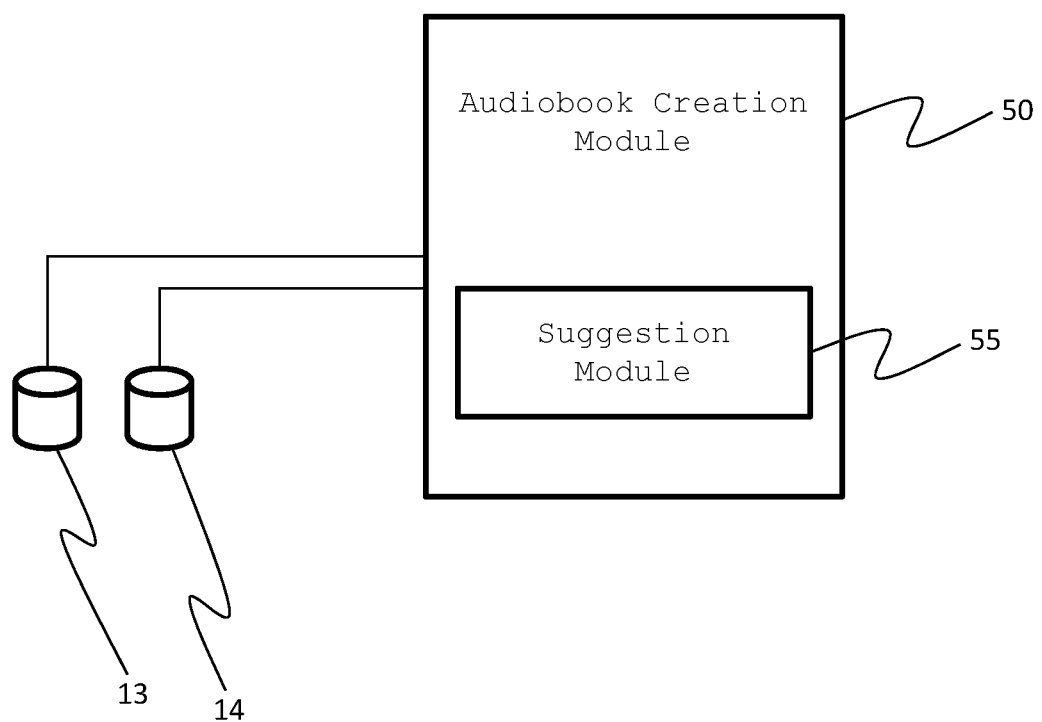
FIG. 4 shows an audiobook creation module having a suggestion module according to the embodiment of the present invention.

As shown in FIGS. 2-4, the system 100 further includes an audiobook creation module 50 to assist users to create an audio file for certain literary work. The user can initiate recording of an audio file and then save it and resume recording any time. The audiobook creation module 50 is configured to provide audio mapping to store locations of the audio file which are associated with corresponding locations of the certain literary work. Using this mapping, reading progress may be displayed on the screen on the user device 20 while listening to an audiobook. Audio mapping is similar to time stamping in that it maps text to specific audio segments or cues.

The server 10 includes a sound effect database 13 and music database 14, where the sound effect database 13 stores a plurality of sound effects and the music database 14 stores a plurality of music. The audiobook creation module 50 is configured to retrieve sounds effects and/or music respectively from the sound effect database 13 and the music database 14 so that the user can use them in creating the audio file. Moreover, the audiobook creation module 50 includes a suggestion module 55 as shown in FIG. 4 which analyzes the certain literary work and provides suggested sound effects and music to the user.

The suggestion module 55 utilizes artificial intelligence technology. The suggestion module 55 stores sound effects and music, as well as the text portions where these sound effects and music have been used. It then analyzes these text portions to identify words, phrases, or other factors that led to the selection of specific sound effects or music. When the user requests to select a sound effect or music, the suggestion module 55 analyzes the text portion where the user intends to add sound effects or music, comparing it to the text portions stored within the module. Subsequently, the suggestion module 55 retrieves the best-matching text portions and corresponding sound effects or music. As the module accumulates more data, the quality of its suggestions is expected to improve.

Furthermore, the audiobook creation module 50 is configured to enable the collaborative creation of audio files by multiple users. The module 50 allows users to create roles, divide the specific literary work into sections, and then assign each section to a role. Users can choose one or more roles and record the corresponding text sections. These recordings can be made either collectively at the same time or individually at different times. Each user has the option to listen to portions recorded by others, particularly the parts immediately preceding or following the segment they intend to record. The audiobook creation module 50 is also configured to modulate the audio file to ensure it sounds natural. If different parts are recorded separately, they may not flow smoothly when combined; thus, modulation is essential.

The system 100 further includes a text-to-speech conversion module that converts a specific literary work into spoken words for playback, as well as a translation module that translates the literary work into other languages. Users can listen to spoken words generated by the text-to-speech conversion module as an alternative to a human-narrated audiobook.

The system 100 is configured to allow users to upload a literary work. Preferably, the uploaded work may be the user's original creation to minimize the risk of copyright infringement. By enabling users to upload their works and allowing others to create audiobooks from them, the system 100 can amass a vast repository of content for user enjoyment. The system also includes an audiobook request module 40, configured to allow users to request the creation of an audio file for a specific literary work. Users may direct this request to specific individuals or groups.

Additionally, the system 100 may comprise a reward calculation module 60 which assigns a reward to a user who creates and uploads an audio file, based on the number of plays the audio file receives. Users may be charged a subscription fee on a monthly, annual, or usage-based basis. Certain users, such as those from underprivileged families, may be exempt from such fees. Using this revenue, the system 100 can reward users who produce audiobooks, thereby incentivizing content creation and ensuring the system's sustainability.

Furthermore, the system 100 features a copyright clearance module 70 that compares uploaded literary works to those stored in the content database 11 to determine any potential copyright issues. This module may focus solely on content uploaded by its users, rather than content provided by professional content providers, who are less likely to present copyright infringement issues. Additionally, the copyright clearance module is configured to check the first publication date of a literary work to determine whether its copyright term has expired.

Above mentioned various modules may be installed on the user application 25 as in FIG. 2 or the server 10 as in FIG. 3 or both.

In the alternative embodiment, the audiobook platform 200 includes a server 10, a user application 25 installed on a user device 20, and an audiobook creation module 50. The server 10 includes a contents database 11 and an audiobook database 12, where the contents database 11 stores literary works and the audiobook database 12 stores audio files corresponding to the literary works. The user application 25 installed on a user device 20 which has a display, speaker, and microphone. The audiobook creation module 50 is configured to assist the user to create an audio file for the certain literary work, The server 10 is connected to the user application 25 for data transmission, and the server 10 is connected to a contents provider device 30 for data transmission. The user application 25 is configured to allow a user to search a certain literary work and its corresponding audio file to play upon the user's selection.

If the corresponding audio file is stored in the audiobook database 12, the user application is configured to play the corresponding audio file on the user device 20. If there are plural corresponding audio files stored in the audiobook database 12, the user application 25 is configured to display the plural corresponding audio files and upon the user's selection, play the selected corresponding audio file.

If the certain literary work is not stored in the contents database 11, the server 10 is configured to send an inquiry to the contents provider device 30 to inquire whether a contents provider associated with the contents provider device 30 has the certain literary work. If the certain literary work is not stored in the contents database 11 and the contents provider associated with the contents provider device 30 has the certain literary work, the system 100 is configured to enable the contents provider device 30 to transmit the certain literary work to the server 10 for being stored in the contents database 11 if the contents provider elects to do so.

The audiobook platform 200 further comprises an audiobook request module 40 which is configured to allow the user to request creation of an audio file for the certain literary work.

The audiobook creation module 50 is configured to provide audio mapping to store locations of the audio file which are associated with corresponding locations of the certain literary work. The server 10 includes a sound effect database 13 and music database 14, wherein the sound effect database 13 stores a plurality of sound effects and the music database 14 stores a plurality of music. The audiobook creation module 50 is configured to retrieve sounds effects and music respectively from the sound effect database 13 and the music database 14 so that the user can use them in creating the audio file. Furthermore, the audiobook creation module 50 includes a suggestion module 55 which analyzes the certain literary work and provides suggested sound effects and music to the user.

The audiobook creation module 50 is configured to enable collaborative audio file creation by multiple users. This module allows users to create roles, divide a specific literary work into sections, and assign each section to a corresponding role. It also allows users to record either simultaneously or at different times.

The audiobook platform 200 further comprise a reward calculation module 60 which assigns a reward to a user who creates and uploads an audio file, considering the number of plays of the audio file.

While the invention has been shown and described with reference to different embodiments thereof, it will be appreciated by those skilled in the art that variations in form, detail, compositions and operation may be made without departing from the spirit and scope of the invention as defined by accompanying claims.

What is claimed is:

1. A system for an audiobook platform comprising:
   a server, comprising a processor and a memory, which includes a contents database and an audiobook database, wherein the contents database stores literary works and the audiobook database stores audio files corresponding to the literary works; and
   a user application installed on a user device wherein the user device has a display and a speaker,
   wherein the server is connected to the user application for data transmission, wherein the user application allows a user to search a certain literary work and its corresponding audio file to play, wherein if the corresponding audio file is stored in the audiobook database, the user application plays the corresponding audio file on the user device upon the user's selection, and wherein if there are plural corresponding audio files stored in the audiobook database, the user application displays the plural corresponding audio files and upon the user's selection, play the selected corresponding audio file, wherein the system further comprising an audiobook creation component, wherein the audiobook creation component assists the user to create an audio file for the certain literary work, wherein the audiobook creation component provides audio mapping to store locations of the audio file which are associated with corresponding locations of the certain literary work, wherein the server includes a sound effect database and music database, wherein the sound effect database stores a plurality of sound effects and the music database stores a plurality of music, wherein the audiobook creation component retrieves sounds effects and music respectively from the sound effect database and the music database so that the user can use them in creating the audio file, wherein the audiobook creation component includes a suggestion component which analyzes the certain literary work and provides suggested sound effects and music to the user, wherein the audiobook creation component allows creation of the audio file by collaboration of a plurality of users, wherein the audiobook creation component allows the users to create roles, separate the certain literary work into sections, and then assign each section to a role, wherein the audiobook creation component allows the plurality of users to record together at the same time or at different time, wherein the system further comprises a contents provider device, wherein the server is connected to the contents provider device for data transmission, wherein if the certain literary work is not stored in the contents database, the server sends an inquiry to the contents provider device to inquire whether a contents provider associated with the contents provider device has the certain literary work, wherein if the certain literary work is not stored in the contents database and the contents provider associated with the contents provider device has the certain literary work, the system enables the contents provider device to transmit the certain literary work to the server for being stored in the contents database.

2. The system of claim 1, wherein if no corresponding audio file is stored in the audiobook database, the server posts an invitation to the users to create and upload a corresponding audio file.

3. The system of claim 1, wherein the audiobook creation component modulates the audio file to make it sound natural.

4. The system of claim 1, further comprising a text-to-speech conversion component which converts the certain literary work into spoken words to be played.

5. The system of claim 1, wherein the system allows the user to upload a literary work.

6. The system of claim 1, further comprising an audiobook request component which allows the user to request creation of an audio file for the certain literary work.

7. The system of claim 1, further comprising a reward calculation component which assigns a reward to a user who creates and uploads an audio file, considering the number of plays of the audio file.

8. The system of claim 1, further comprising a copyright clearance component which compares an uploaded literary work to the literary works stored in the contents database in order to decide whether there is a copyright issue.

9. An audiobook platform, comprising:

a server, comprising a processor and a memory, which includes a contents database and an audiobook database, wherein the contents database stores literary works and the audiobook database stores audio files corresponding to the literary works;

a user application installed on a user device wherein the user device has a display, speaker, and microphone; and an audiobook creation component, wherein the audiobook creation component assists the user to create an audio file for the certain literary work, wherein the server is connected to the user application for data transmission, wherein the user application allows a user to search a certain literary work and its corresponding audio file to play upon the user's selection, wherein if the corresponding audio file is stored in the audiobook database, the user application plays the corresponding audio file on the user device, and wherein if there are plural corresponding audio files stored in the audiobook database, the user application displays the plural corresponding audio files and upon the user's selection, play the selected corresponding audio file, wherein the server is connected to a contents provider device for data transmission, wherein the audiobook creation component provides audio mapping to store locations of the audio file which are associated with corresponding locations of the certain literary work, wherein the server includes a sound effect database and music database, wherein the sound effect database stores a plurality of sound effects and the music database stores a plurality of music, wherein the audiobook creation component retrieves sounds effects and music respectively from the sound effect database and the music database so that the user can use them in creating the audio file, wherein the audiobook creation component includes a suggestion component which analyzes the certain literary work and provides suggested sound effects and music to the user, wherein the audiobook creation component allows creation of the audio file by collaboration of a plurality of users, wherein the audiobook creation component allows the users to create roles, separate the certain literary work into sections, and then assign each section to a role, wherein the audiobook creation component allows the plurality of users to record together at the same time or at different time, wherein if the certain literary work is not stored in the contents database, the server sends an inquiry to the contents provider device to inquire whether a contents provider associated with the contents provider device has the certain literary work, wherein if the certain literary work is not stored in the contents database and the contents provider associated with the contents provider device has the certain literary work, the system enables the contents provider device to transmit the certain literary work to the server for being stored in the contents database, wherein the audiobook platform further comprises an audiobook request component which allows the user to request creation of an audio file for the certain literary work.

10. The audiobook platform of claim 9, further comprising a reward calculation component which assigns a reward to a user who creates and uploads an audio file, considering the number of plays of the audio file.

\* \* \* \* \*